United States Patent
Baba et al.

(10) Patent No.: US 9,873,423 B2
(45) Date of Patent: Jan. 23, 2018

(54) HYBRID VEHICLE

(71) Applicant: TOYOTA JIDOSHA KABUSHIKI KAISHA, Toyota-shi, Aichi-ken (JP)

(72) Inventors: Masayuki Baba, Toyota (JP); Yoshiaki Tsuruta, Nagakute (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 4 days.

(21) Appl. No.: 15/108,606

(22) PCT Filed: Dec. 3, 2014

(86) PCT No.: PCT/JP2014/006036
§ 371 (c)(1),
(2) Date: Jun. 28, 2016

(87) PCT Pub. No.: WO2015/107586
PCT Pub. Date: Jul. 23, 2015

(65) Prior Publication Data
US 2016/0325733 A1 Nov. 10, 2016

(30) Foreign Application Priority Data

Jan. 17, 2014 (JP) ................................. 2014-006909

(51) Int. Cl.
*B60L 11/02* (2006.01)
*B60W 20/19* (2016.01)
(Continued)

(52) U.S. Cl.
CPC ............. *B60W 20/19* (2016.01); *B60K 6/365* (2013.01); *B60K 6/445* (2013.01); *B60K 6/543* (2013.01);
(Continued)

(58) Field of Classification Search
CPC .................. B60L 11/12; B60L 15/2054; B60L 2240/525; Y10T 477/23; Y10T 477/623;
(Continued)

(56) References Cited

U.S. PATENT DOCUMENTS 5,022,285 A * 6/1991 Suzuki .................. B60W 30/18
474/18
5,514,046 A * 5/1996 Petersmann .......... B60W 10/02
477/39

(Continued)

FOREIGN PATENT DOCUMENTS

| JP | 2003-254421 | 9/2003 |
| JP | 2008-267467 | 11/2008 |
| JP | 2014-213701 | 11/2014 |

*Primary Examiner* — Dalena Tran
(74) *Attorney, Agent, or Firm* — Finnegan, Henderson, Farabow, Garrett & Dunner, LLP

(57) ABSTRACT

In a hybrid vehicle including an engine, a motor driven by a battery output, and a continuously variable transmission, when acceleration is requested, an ECU executes feeling-of-acceleration producing control for gradually increasing an engine rotation speed from an initial value NEini lower than an optimum rotation speed. With the battery output, the ECU makes up for a shortfall of engine output caused by the feeling-of-acceleration producing control. When starting the feeling-of-acceleration producing control, the ECU calculates a basic initial value NEini_base lower than the optimum rotation speed, and calculates, based on an atmospheric pressure, a lower limit value NEmin that allows the battery output to be maintained to be equal to or lower than prescribed electric power. The ECU selects a larger one of basic initial value NEini_base and lower limit value NEmin as initial value NEini.

3 Claims, 7 Drawing Sheets

(51) Int. Cl.
   *B60K 6/365*      (2007.10)
   *B60K 6/445*      (2007.10)
   *B60W 10/06*      (2006.01)
   *B60W 10/105*     (2012.01)
   *B60K 6/543*      (2007.10)
   *F16H 61/66*      (2006.01)

(52) U.S. Cl.
   CPC .......... *B60W 10/06* (2013.01); *B60W 10/105* (2013.01); *B60W 2510/0666* (2013.01); *B60W 2710/0644* (2013.01); *B60Y 2200/92* (2013.01); *B60Y 2300/188* (2013.01); *B60Y 2300/43* (2013.01); *B60Y 2400/72* (2013.01); *F16H 2061/6611* (2013.01); *Y02T 10/6239* (2013.01); *Y10S 903/918* (2013.01)

(58) Field of Classification Search
   CPC   Y10S 903/903; Y10S 903/947; B60W 10/06; B60W 10/08; B60W 10/10; B60W 30/188; B60W 2510/0638; B60W 20/00
   USPC ................ 701/22, 66, 70; 180/65.27, 65.28; 60/448, 469; 903/903, 947; 477/43, 45, 477/98
   See application file for complete search history.

(56) References Cited

U.S. PATENT DOCUMENTS

| | | | |
|---|---|---|---|
| 6,019,701 A * | 2/2000 | Mori | .................. F16H 61/6648 477/46 |
| 2003/0162633 A1 | 8/2003 | Nakayama et al. | |

* cited by examiner

[Fig. 5]

HYBRID VEHICLE

CROSS-REFERENCE TO RELATED APPLICATIONS

This application is a national phase application of International Application No. PCT/JP2014/006036, filed Dec. 3, 2014, and claims the priority of Japanese Application No. 2014-006909, filed Jan. 17, 2014, the content of both of which is incorporated herein by reference.

TECHNICAL FIELD

The present invention relates to a vehicle, and particularly to a hybrid vehicle including a continuously variable transmission.

BACKGROUND ART

Japanese Patent Laying-Open No. 2008-267467 (PTL 1) discloses the technique, in a vehicle including a continuously variable transmission, of suppressing a delay in generation of driving force by delaying a shifting start timing of the continuously variable transmission in a highland and the like, in view of the fact that a decrease in atmospheric pressure in the highland results in a decrease in engine output.

CITATION LIST

Patent Literature

[PTL 1] Japanese Patent Laying-Open No. 2008-267467

SUMMARY OF INVENTION

Technical Problem

Some of hybrid vehicles that can run by using the motive power from at least one of an engine and a motor include a continuously variable transmission between the engine and a driving wheel. In such a hybrid vehicle, in the case of making an attempt to produce a feeling of acceleration by gradually increasing an engine rotation speed from a value lower than an optimum fuel efficiency rotation speed when acceleration is requested by the user, a shortfall of engine output is made up for with a battery output (motor output) and thus the requested driving force can be obtained, even if the production of a feeling of acceleration results in the shortfall of engine output with respect to the requested driving force.

However, when the atmospheric pressure is low in a highland and the like, the engine output decreases. Therefore, when feeling-of-acceleration producing control is executed in the low atmospheric pressure state, the shortfall of engine output increases further and cannot be made up for with the battery output, which may result in a shortfall of the driving force.

The present invention has been made to solve the aforementioned problem, and an object thereof is to provide a hybrid vehicle including an engine, a motor driven by output electric power of a power storage device, and a continuously variable transmission, in which a shortfall of driving force caused by a shortfall of output of the power storage device is suppressed even when increase control for increasing an engine rotation speed with an increase in vehicle speed is executed in a low atmospheric pressure state.

Solution to Problem (1) A vehicle according to the present invention is a vehicle that can run by using motive power from at least one of an engine whose output changes in accordance with an atmospheric pressure and a motor driven by output electric power of a power storage device, the vehicle including: a continuously variable transmission provided between the engine and a driving wheel; and a control device for controlling the engine, the motor and the continuously variable transmission. The control device calculates a requested output of the engine based on a requested vehicle output and the atmospheric pressure, calculates a requested rotation speed of the engine based on the calculated requested output, and selects a smaller one of the calculated requested rotation speed and a predetermined upper limit rotation speed as an optimum rotation speed of the engine. When acceleration is requested, the control device executes increase control for increasing a rotation speed of the engine from a value lower than the optimum rotation speed, as vehicle speed increases, and by driving the motor with the output electric power of the power storage device, makes up for a shortfall of output of the engine caused by the increase control. When executing the increase control, the control device calculates a basic rotation speed lower than the optimum rotation speed by a prescribed speed, calculates a lower limit rotation speed of the engine based on the atmospheric pressure, the lower limit rotation speed of the engine allowing the output electric power of the power storage device to be maintained to be equal to or smaller than a prescribed value, and executes selection processing for selecting a larger one of the basic rotation speed and the lower limit rotation speed as the rotation speed of the engine during the increase control.

With such a configuration, when the increase control is executed, the basic rotation speed lower than the optimum rotation speed by the prescribed speed is calculated, and the lower limit rotation speed of the engine that allows the output electric power of the power storage device to be maintained to be equal to or smaller than the prescribed value is calculated based on the atmospheric pressure. In view of the fact that the engine output becomes lower as the atmospheric pressure becomes lower, for example, the lower limit rotation speed is calculated to have a larger value as the atmospheric pressure becomes lower. When the atmospheric pressure is comparatively high and the lower limit rotation speed is lower than the basic rotation speed, the basic rotation speed is selected as the rotation speed of the engine during the increase control. As a result, the increase control can be executed using the basic rotation speed and the output electric power of the power storage device can be maintained to be smaller than the prescribed value. On the other hand, when the lower limit rotation speed exceeds the basic rotation speed with a decrease in atmospheric pressure, the lower limit rotation speed is selected as the rotation speed of the engine during the increase control. As a result, even in the low atmospheric pressure state, the increase control can be executed using the lower limit rotation speed and the output electric power of the power storage device can be maintained to be the prescribed value. Therefore, even when the increase control is executed in the low atmospheric pressure state, a shortfall of driving force caused by a shortfall of output of the power storage device can be suppressed.

(2) Preferably, the control device executes the selection processing when starting the increase control, and thereby, the control device sets an initial rotation speed of the engine during the increase control.

With such a configuration, it is possible to suppress the shortfall of driving force caused by the shortfall of output of the power storage device, even when the increase control is started in the low atmospheric pressure state.

(3) Preferably, the control device further executes processing for restricting the initial rotation speed to be equal to or lower than the optimum rotation speed.

With such a configuration, it is possible to prevent the initial rotation speed of the engine during the increase control from exceeding the optimum rotation speed (upper limit rotation speed) and the user from having an uncomfortable feeling.

Advantageous Effects of Invention

According to the present invention, in the hybrid vehicle including the engine, the motor driven by the output electric power of the power storage device, and the continuously variable transmission, the shortfall of driving force caused by the shortfall of output of the power storage device can be suppressed even when the increase control for increasing the engine rotation speed with the increase in vehicle speed is executed in the low atmospheric pressure state.

DESCRIPTION OF EMBODIMENTS

Figure 1:
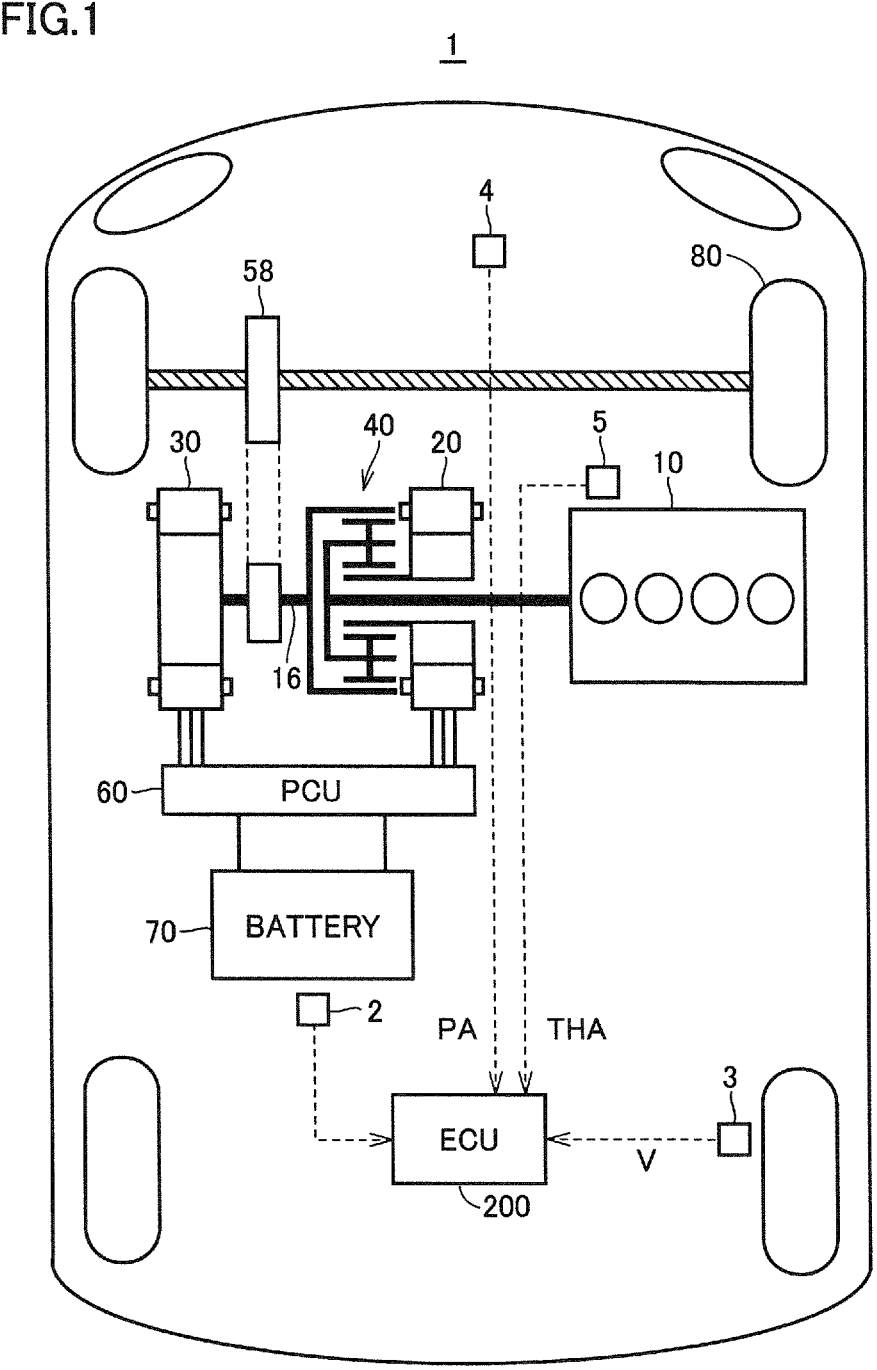
FIG. 1 is a diagram showing an overall configuration of a vehicle.

An embodiment of the present invention will be described hereinafter with reference to the drawings. In the following description, the same components are denoted by the same reference characters. Their names and functions are also the same. Therefore, detailed description about them will not be repeated.

The term of "electric power" used herein may refer to electric power (power) in a narrow sense, and may refer to an amount of electric power (amount of work) or electric energy which is electric power in a broad sense. Therefore, the term of "electric power" used herein is flexibly interpreted depending on the situation of use of the term.

<Overall Configuration of Vehicle>

FIG. 1 is a diagram showing an overall configuration of a vehicle 1 according to the present embodiment. Vehicle 1 includes an engine 10, a drive shaft 16, a first motor generator (hereinafter referred to as "first motor") 20, a second motor generator (hereinafter referred to as "second motor") 30, a power split device 40, a speed reducer 58, a PCU (Power Control Unit) 60, a battery 70, a driving wheel 80, and an ECU (Electronic Control Unit) 200.

This vehicle 1 is a hybrid vehicle that can run by using motive power from at least one of engine 10 and second motor 30.

The motive power generated by engine 10 is divided, by power split device 40, into a path for transmitting the motive power to drive shaft 16 (driving wheel 80) and a path for transmitting the motive power to first motor 20.

Each of first motor 20 and second motor 30 is a three-phase alternating current rotating electric machine driven by PCU 60. First motor 20 can generate electric power by using the motive power of engine 10 divided by power split device 40. Second motor 30 can generate the motive power by using at least one of the electric power stored in battery 70 and the electric power generated by first motor 20. The motive power generated by second motor 30 is transmitted through drive shaft 16 to driving wheel 80. Second motor 30 also generates electric power by using the rotational energy of drive shaft 16, and thus, functions as a regenerative brake. The electric power generated by second motor 30 is charged into battery 70 through PCU 60.

Power split device 40 is a planetary gear mechanism including a sun gear, a ring gear, a pinion gear, and a carrier. The sun gear is coupled to first motor 20. The ring gear is coupled to second motor 30 and driving wheel 80 via drive shaft 16. The pinion gear engages with each of the sun gear and the ring gear. The carrier supports the pinion gear in a rotatable manner, and is coupled to a crankshaft of engine 10.

Figure 2:
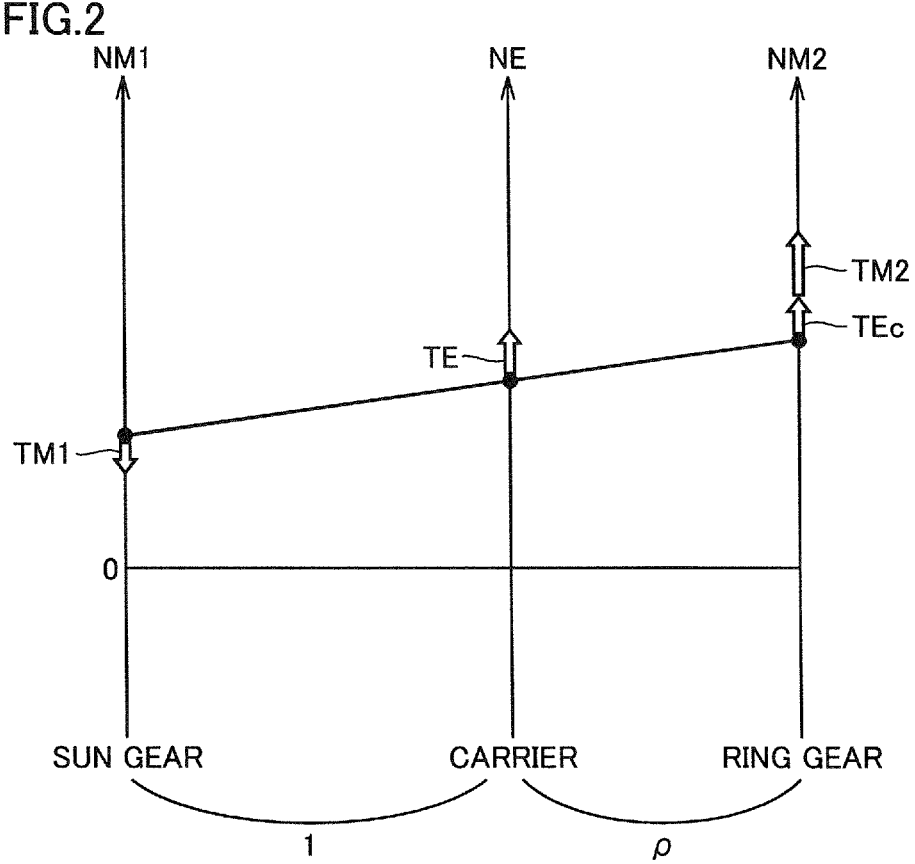
FIG. 2 is a diagram showing, in a nomographic chart of a power split device, a relation among an engine rotation speed NE, a first motor rotation speed NM1 and a second motor rotation speed NM2.

FIG. 2 is a diagram showing, in a nomographic chart of power split device 40, a relation among a rotation speed of engine 10 (hereinafter referred to as "engine rotation speed NE"), a rotation speed of first motor 20 (hereinafter referred to as "first motor rotation speed NM1"), and a rotation speed of second motor 30 (hereinafter referred to as "second motor rotation speed NM2").

Since engine 10, first motor 20 and second motor 30 are coupled via power split device 40 formed of the planetary gear, engine rotation speed NE, first motor rotation speed NM1 and second motor rotation speed NM2 have such a relation that they are connected by a straight line in the nomographic chart of power split device 40 as shown in FIG. 2 (such a relation that when any two values are determined, the remaining one value is also determined unambiguously).

For example, even when second motor rotation speed NM2 (i.e., vehicle speed V) is fixed, engine rotation speed NE can be freely changed by adjusting first motor rotation speed NM1. Therefore, a ratio of engine rotation speed NE to vehicle speed V can be changed steplessly by adjusting first motor rotation speed NM1. Namely, in vehicle 1, first motor 20 and power split device 40 function as an electric-type continuously variable transmission that can steplessly change the ratio of engine rotation speed NE to vehicle speed V. The vehicle to which the present invention is applicable is not limited to the vehicle including the electric-type continuously variable transmission, and the present invention is also applicable to a vehicle including a mechanical-type (e.g., belt-type) continuously variable transmission.

FIG. 2 also shows one example of a relation among the torque of engine 10 (hereinafter referred to as "engine torque TE"), the torque of first motor 20 (hereinafter referred to as "first motor torque TM1"), and the torque of second motor 30 (hereinafter referred to as "second motor torque TM2") when vehicle 1 runs forward by using the motive power from both engine 10 and second motor 30.

When engine 10 is operated, engine torque TE acts on the carrier of power split device 40. By causing first motor torque TM1 serving as a reaction force of engine torque TE to act on the sun gear of power split device 40, the torque transmitted from the engine (hereinafter referred to as "engine direct torque TEc") acts on the ring gear of power split device 40. In addition, second motor torque TM2 acts directly on the ring gear of power split device 40. As a result, the total torque of engine direct torque TEc and second motor torque TM2 acts on the ring gear. In accordance with this total torque, driving wheel 80 is rotated to cause vehicle 1 to run.

Referring again to FIG. 1, PCU 60 is a power conversion device that performs power conversion among battery 70, first motor 20 and second motor 30 based on a control signal from ECU 200.

Battery 70 is a secondary battery configured to include, for example, nickel-metal hydride, lithium ion and the like. Battery 70 may only be a power storage device that can input and output the electric power to and from first motor 20 and second motor 30, and a large-capacitance capacitor may, for example, be used instead of battery 70.

Vehicle 1 is provided with a monitoring sensor 2, a vehicle speed sensor 3, an atmospheric pressure sensor 4, and an intake air temperature sensor 5. Monitoring sensor 2 detects a state of battery 70 (such as current, voltage and temperature). Vehicle speed sensor 3 detects vehicle speed V based on the rotation speed of the wheels. Atmospheric pressure sensor 4 detects an atmospheric pressure (barometric pressure) PA. Intake air temperature sensor 5 detects a temperature THA of the air taken into engine 10 (hereinafter referred to as "intake air temperature"). Furthermore, although not shown, vehicle 1 is provided with a plurality of sensors for detecting various physical amounts required to control vehicle 1, such as an accelerator opening degree A (an amount of accelerator pedal operation by the user) and engine rotation speed NE. These sensors transmit the results of detection to ECU 200.

ECU 200 is an electronic control unit having a not-shown CPU (Central Processing Unit) and a not-shown memory embedded therein. ECU 200 executes prescribed arithmetic processing based on the information from the sensors and the information stored in the memory, and controls the devices of vehicle 1 based on the result of arithmetic processing.

Based on the result of detection by monitoring sensor 2, ECU 200 calculates an amount of electric power stored in battery 70 (hereinafter also referred to as "SOC"). As a method for calculating the SOC, it is possible to use various known methods such as, for example, a method for calculating the SOC by using a relation between the voltage of battery 70 and the SOC, and a method for calculating the SOC by using a summed current value of battery 70.

Based on the SOC and the temperature of battery 70, ECU 200 calculates an allowable charge power Win and an allowable discharge power Wout (both are expressed in the unit watt) of battery 70. ECU 200 restricts the electric power charged into battery 70 (hereinafter referred to as "battery charge power Pin") such that battery charge power Pin does not exceed allowable charge power Win. ECU 200 also restricts the electric power discharged from battery 70 (hereinafter referred to as "battery discharge power Pout") such that battery discharge power Pout does not exceed allowable discharge power Wout.

ECU 200 controls engine 10, PCU 60 and the like, thereby controlling the vehicle driving force.

<Control of Vehicle Driving Force>

Figure 3:
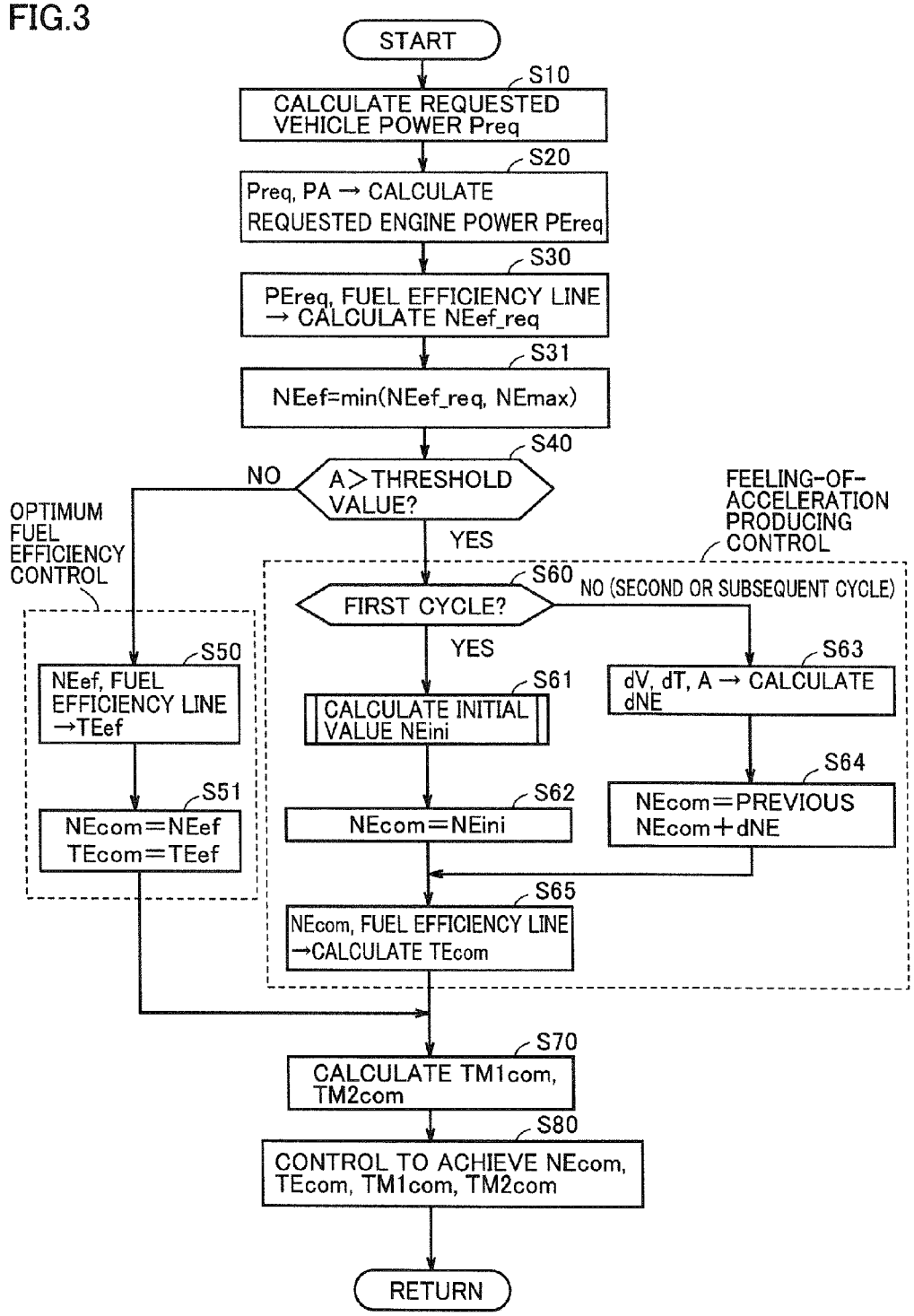
FIG. 3 is a flowchart showing a flow of processing executed by an ECU.

FIG. 3 is a flowchart showing a flow of processing executed when ECU 200 controls the vehicle driving force. This flowchart is repeatedly executed at a prescribed arithmetic cycle.

In step (hereinafter abbreviated as "S") 10, ECU 200 calculates a running power Preq requested for vehicle 1 (hereinafter referred to as "requested vehicle power"), based on accelerator opening degree A, vehicle speed V and the like.

In S20, ECU 200 calculates, as a requested engine power PEreq, a value obtained by correcting requested vehicle power Preq based on atmospheric pressure PA (value detected by atmospheric pressure sensor 4). For example, ECU 200 calculates requested engine power PEreq by using the following equation (a):

$$PEreq = Preq \times \text{correction coefficient } Kpa \qquad (a).$$

Correction coefficient Kpa herein refers to a coefficient for converting requested vehicle power Preq into requested engine power PEreq in accordance with atmospheric pressure PA. For example, correction coefficient Kpa is set at "1/atmospheric pressure PA". As a result, correction coefficient Kpa becomes "1" when atmospheric pressure PA is 1 atmospheric pressure. Correction coefficient Kpa is set to have a larger value as atmospheric pressure PA becomes lower.

Namely, in a highland and the like, atmospheric pressure PA is low and the air density (air mass with respect to air volume) is low. Therefore, even when the other operation conditions (such as a throttle opening degree, an amount of fuel injection and an ignition timing) are the same, the power output by engine 10 (hereinafter also referred to as "engine power PE") decreases. In consideration of this point, ECU 200 sets, as requested engine power PEreq, a value obtained by preliminarily adding an amount of decrease in engine power PE caused by the decrease in atmospheric pressure PA to requested vehicle power Preq.

Engine power PE changes in accordance with not only atmospheric pressure PA but also intake air temperature THA. Therefore, requested vehicle power Preq may be corrected based on intake air temperature THA, in addition to atmospheric pressure PA. For example, when intake air temperature THA is expressed in the unit kelvin (absolute temperature), correction coefficient Kpa in the aforementioned equation (a) may be set at "(intake air temperature THA/273)/atmospheric pressure PA".

In S30, ECU 200 calculates a requested rotation speed NEef_req by using requested engine power PEreq and a fuel efficiency line (see FIG. 4 described below).

In S31, ECU 200 sets a smaller one of requested rotation speed NEef_req and a predetermined upper limit rotation speed NEmax as an optimum rotation speed NEef. Optimum rotation speed NEef thus set is stored in the memory.

Figure 4:
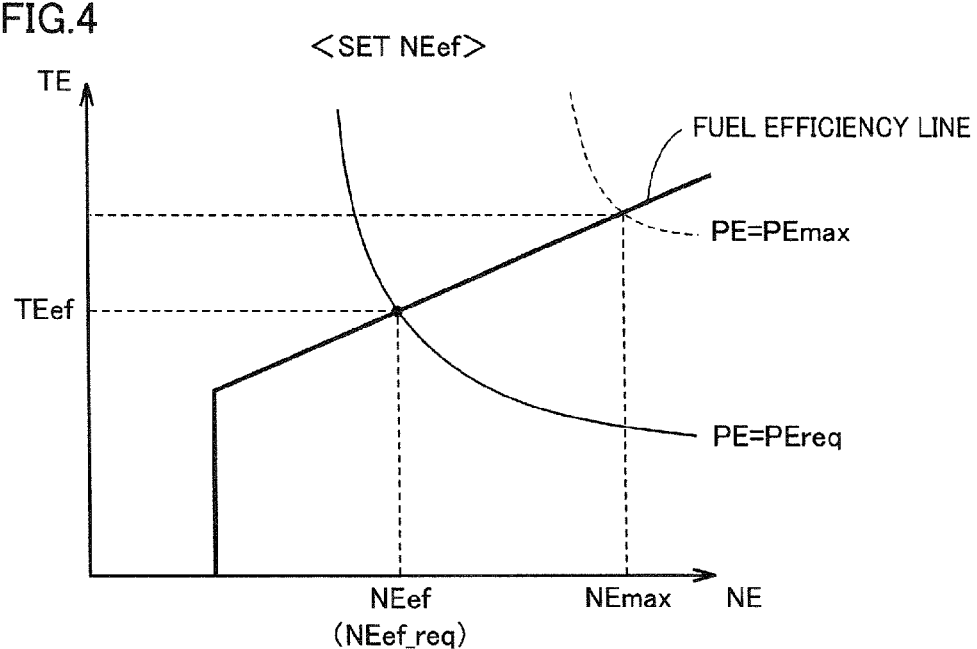
FIG. 4 is a diagram schematically showing a method for setting an optimum rotation speed NEef.

FIG. 4 is a diagram schematically showing a method for setting optimum rotation speed NEef. The fuel efficiency line shown in FIG. 4 is a line obtained by connecting operating points where engine 10 can be operated most efficiently (i.e., at an optimum fuel efficiency), and engine rotation speed NE and engine torque TE are used as parameters. Assuming that the horizontal axis represents engine rotation speed NE and the vertical axis represents engine torque TE, the fuel efficiency line is expressed by a curved line shown in FIG. 4. On the other hand, engine power PE is a product of engine rotation speed NE and engine torque TE (PE=NE×TE), and thus, a curved line of PE=PEreq (fixed) is expressed by an inversely proportional curved line shown in FIG. 4.

ECU 200 calculates requested rotation speed NEef_req from an intersection point of the curved line indicating the fuel efficiency line and the inversely proportional curved line indicating PE=PEreq (S30 in FIG. 3). Therefore, requested rotation speed NEef_req is the engine rotation speed at which engine 10 can output requested engine power PEreq most efficiently.

When requested rotation speed NEef_req thus calculated is lower than upper limit rotation speed NEmax (in the case shown in FIG. 4), ECU 200 sets requested rotation speed NEef_req as optimum rotation speed NEef.

On the other hand, if engine rotation speed NE is allowed to exceed upper limit rotation speed NEmax, engine rotation speed NE becomes too high, which provides an uncomfortable feeling to the user. In order to prevent this, ECU 200 sets upper limit rotation speed NEmax as optimum rotation speed NEef when requested rotation speed NEef_req is higher than upper limit rotation speed NEmax. Therefore, in the present embodiment, a maximum value PEmax of the engine power is determined by upper limit rotation speed NEmax and the fuel efficiency line.

Referring again to FIG. 3, after setting optimum rotation speed NEef in S31, ECU 200 determines whether accelerator opening degree A is in excess of a threshold value or not. This processing is processing for determining whether there is a request for acceleration by the user or not. By using the other parameters such as the target driving force instead of or in addition to accelerator opening degree A, it may be determined whether there is a request for acceleration by the user or not.

If accelerator opening degree A is not in excess of the threshold value (NO in S40), ECU 200 sets the operating point of engine 10 in accordance with optimum fuel efficiency control shown in S50 and S51. In the present embodiment, the optimum fuel efficiency control refers to processing for setting a commanded engine operating point (a commanded engine rotation speed NEcom and a commanded engine torque TEcom) such that engine 10 outputs requested engine power PEreq most efficiently.

Specifically, in S50, ECU 200 calculates an optimum torque TEef corresponding to optimum rotation speed NEef set in S31, by using the fuel efficiency line. Then, in S51, ECU 200 sets optimum rotation speed NEef as commanded engine rotation speed NEcom, and sets optimum torque TEef as commanded engine torque TEcom.

On the other hand, if accelerator opening degree A is in excess of the threshold value (YES in S40), ECU 200 sets the operating point of engine 10 in accordance with feeling-of-acceleration producing control shown in S60 to S65. In the present embodiment, the feeling-of-acceleration producing control refers to processing for increasing engine rotation speed NE with an increase in vehicle speed in order to provide a feeling of acceleration similar to that provided by a gear-type transmission to the user. Hereinafter, the feeling-of-acceleration producing control will also be referred to as "NE increase control".

Specifically, in S60, ECU 200 determines whether this is the first cycle of the feeling-of-acceleration producing control or not. For example, when accelerator opening degree A in the previous cycle is smaller than the threshold value, ECU 200 determines that this is the first cycle of the feeling-of-acceleration producing control.

If this is the first cycle of the feeling-of-acceleration producing control (YES in S60), ECU 200 calculates an initial value NEini of the engine rotation speed in S61. Initial value NEini is calculated to be lower than optimum rotation speed NEef set in S31. A method for calculating initial value NEini will be described in detail below. Then, in S62, ECU 200 sets initial value NEini as commanded engine rotation speed NEcom.

On the other hand, if this is the second or subsequent cycle of the feeling-of-acceleration producing control (NO in S60), ECU 200 calculates an increase rate dNE of the engine rotation speed in S63. For example, ECU 200 calculates increase rate dNE by using the following equation (b):

$$dNE=\max(dNEv,dNEt)+dNEa \qquad (b).$$

dNEv herein refers to a rate of increase in engine rotation speed corresponding to a vehicle speed increase amount dV from the previous cycle to this cycle (hereinafter referred to as "vehicle speed-corresponding increase rate"). Vehicle speed-corresponding increase rate dNEv is calculated to have a larger value as vehicle speed increase amount dV becomes larger.

dNEt refers to a rate of increase in engine rotation speed corresponding to an elapsed time dT from the previous cycle to this cycle (hereinafter referred to as "time-corresponding increase rate"). Time-corresponding increase rate dNEt is calculated to have a value larger than vehicle speed-corresponding increase rate dNEv when vehicle speed increase amount dV is substantially zero, and smaller than vehicle speed-corresponding increase rate dNEv when vehicle speed increase amount dV is comparatively high. Time-corresponding increase rate dNEt is prestored as a fixed value.

dNEa refers to a rate of increase in engine rotation speed corresponding to accelerator opening degree A in this cycle (hereinafter referred to as "accelerator-corresponding increase rate"). Accelerator-corresponding increase rate dNEa is calculated to have a larger value as accelerator opening degree A becomes larger.

As shown in the aforementioned equation (b), ECU 200 calculates, as increase rate dNE, a rate of increase obtained by adding accelerator-corresponding increase rate dNEa to a larger one of vehicle speed-corresponding increase rate dNEv and time-corresponding increase rate dNEt.

In S64, ECU 200 calculates, as commanded engine rotation speed NEcom in this cycle, a value obtained by adding increase rate dNE calculated in S63 to commanded engine rotation speed NEcom in the previous cycle, as shown in the following equation (c):

$$NEcom=\text{previous } NEcom+dNE \qquad (c).$$

Therefore, during the feeling-of-acceleration producing control, commanded engine rotation speed NEcom is gradually increased from initial value NEini at increase rate dNE. As a result, a feeling of acceleration can be provided to the user.

After calculating commanded engine rotation speed NEcom in S62 or S64, ECU 200 calculates commanded engine torque TEcom by using commanded engine rotation speed NEcom and the fuel efficiency line in S65.

Figure 5:
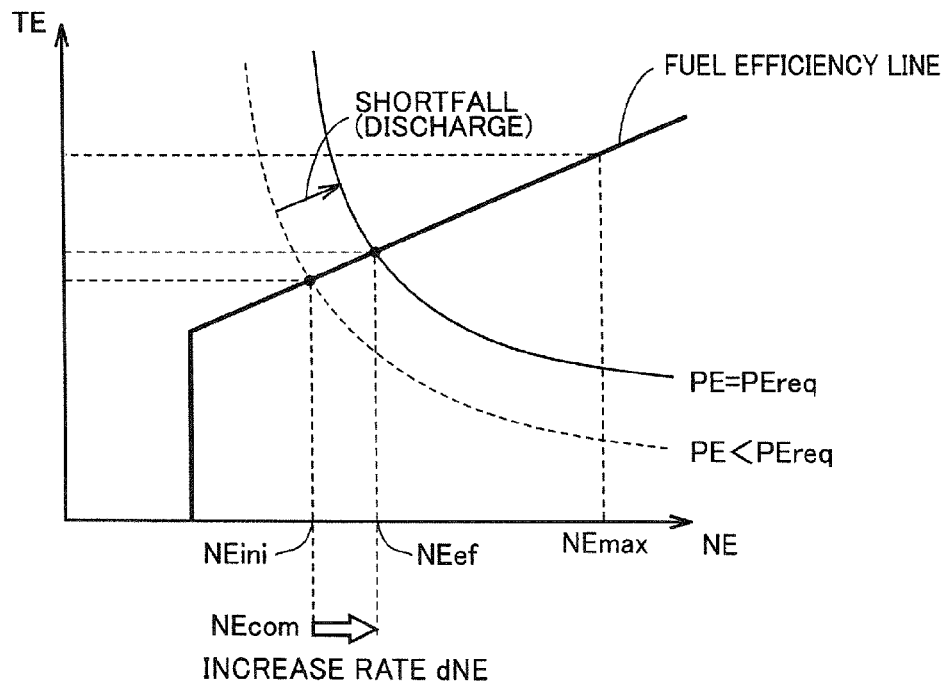
FIG. 5 is a diagram schematically showing a method for setting a commanded engine rotation speed NEcom and a commanded engine torque TEcom in accordance with feeling-of-acceleration producing control.

FIG. 5 is a diagram schematically showing a method for setting commanded engine rotation speed NEcom and commanded engine torque TEcom in accordance with the feeling-of-acceleration producing control (processing in S60 to S65 in FIG. 3).

In the first cycle of the feeling-of-acceleration producing control, commanded engine rotation speed NEcom is set at initial value NEini lower than optimum rotation speed NEef, and commanded engine torque TEcom corresponding to initial value NEini is calculated by using the fuel efficiency line. Therefore, engine power PE in the first cycle of the feeling-of-acceleration producing control has a value smaller than requested engine power PEreq.

In the second or subsequent cycle of the feeling-of-acceleration producing control, commanded engine rotation speed NEcom is gradually increased at increase rate dNE, and thus, engine power PE also increases gradually. Then, when commanded engine rotation speed NEcom reaches optimum rotation speed NEef, engine power PE becomes equal to requested engine power PEreq.

As described above, by executing the feeling-of-acceleration producing control, engine power PE temporarily has a value smaller than requested engine power PEreq. Since a shortfall of engine power PE caused by the feeling-of-acceleration producing control is made up for with the output of second motor 30 (i.e., battery discharge power Pout) in processing in S70 described below, the vehicle driving force requested by the user is achieved.

Referring again to FIG. 3, when the commanded engine operating point (commanded engine rotation speed NEcom and commanded engine torque TEcom) is set in accordance with the optimum fuel efficiency control or the feeling-of-acceleration producing control, ECU 200 calculates, in S70, a commanded first motor torque TM1com and a commanded second motor torque TM2com such that requested vehicle power Preq is transmitted to driving wheel 80 when engine 10 is operated at the commanded engine operating point.

As described above, during the feeling-of-acceleration producing control, engine power PE becomes insufficient with respect to requested engine power PEreq (see FIG. 5). In the processing in S70, commanded second motor torque TM2com is calculated such that this shortfall of engine power PE is made up for with the output of second motor 30 (i.e., battery discharge power Pout).

In S80, ECU 200 controls the throttle opening degree, the amount of fuel injection and the ignition timing of engine 10 as well as a timing of opening and closing an air intake valve, such that engine 10 is operated at the operating point formed of commanded engine rotation speed NEcom and commanded engine torque TEcom. ECU 200 also controls PCU 60 such that first motor 20 outputs commanded first motor torque TM1com and second motor 30 outputs commanded second motor torque TM2com.

<Processing for Calculating Initial Value NEini of Engine Rotation Speed in Feeling-of-Acceleration Producing Control>

As described above, in vehicle 1, the amount of decrease in engine power PE caused by the decrease in atmospheric pressure PA is basically made up for by preliminarily making an increase correction of optimum rotation speed NEef in accordance with the decrease in atmospheric pressure PA (see S20 to S31 in FIG. 3).

On the other hand, in the present embodiment, when acceleration is requested by the user, the feeling-of-acceleration producing control is executed in order to provide a feeling of acceleration to the user. The shortfall of engine power PE caused by this feeling-of-acceleration producing control is made up for with the output of second motor 30 (battery discharge power Pout).

However, when the feeling-of-acceleration producing control is executed in the low atmospheric pressure PA state, the shortfall of engine power PE cannot be made up for with battery discharge power Pout, which may result in a shortfall of the driving force. This phenomenon will be described with reference to FIG. 6.

Figure 6:
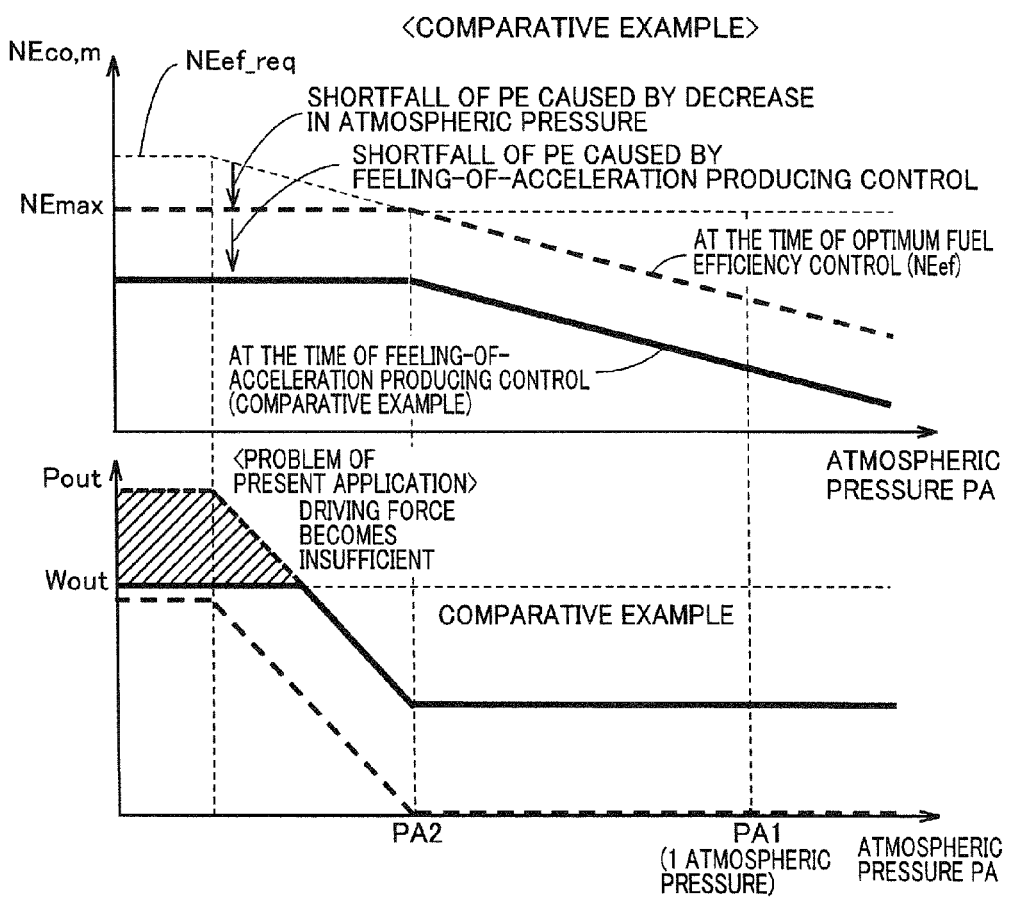
FIG. 6 is a diagram showing a comparative example for the present invention.

FIG. 6 is a diagram showing one example (a comparative example for the present invention) of a correspondence relation among commanded engine rotation speed NEcom, battery discharge power Pout and atmospheric pressure PA when the processing for calculating initial value NEini according to the present embodiment is not executed. In FIG. 6, commanded engine rotation speed NEcom and battery discharge power Pout during the optimum fuel efficiency control are indicated by broken lines, and commanded engine rotation speed NEcom and battery discharge power Pout during the feeling-of-acceleration producing control are indicated by solid lines.

Commanded engine rotation speed NEcom during the optimum fuel efficiency control (broken line) is set at optimum rotation speed NEef. While the increase correction of this optimum rotation speed NEef is made in accordance with a decrease in atmospheric pressure PA, optimum rotation speed NEef is restricted to be equal to or lower than upper limit rotation speed NEmax in order to prevent engine rotation speed NE from becoming too high and the user from having an uncomfortable feeling. Therefore, in a region where atmospheric pressure PA is lower than a prescribed value (a prescribed atmospheric pressure PA2 in the example shown in FIG. 6), optimum rotation speed NEef is restricted to upper limit rotation speed NEmax lower than requested rotation speed NEef_req, and thus, engine power PE becomes insufficient with respect to requested vehicle power Preq (hereinafter, this shortfall will be referred to as "shortfall of PE caused by the decrease in atmospheric pressure"). The shortfall of PE caused by the decrease in atmospheric pressure is made up for with battery discharge power Pout. At this time, as shown in FIG. 6, battery discharge power Pout does not exceed allowable discharge power Wout, and thus, the shortfall of the driving force does not occur during the optimum fuel efficiency control.

On the other hand, commanded engine rotation speed NEcom during the feeling-of-acceleration producing control (solid line) is set to have a value lower than optimum rotation speed NEef. As a result, engine power PE during the feeling-of-acceleration producing control becomes insufficient with respect to requested vehicle power Preq (hereinafter, this shortfall will be referred to as "shortfall of PE caused by the feeling-of-acceleration producing control"). Therefore, when the feeling-of-acceleration producing control is executed in the region where atmospheric pressure PA is lower than prescribed atmospheric pressure PA2, not only the shortfall of PE caused by the decrease in atmospheric pressure but also the shortfall of PE caused by the feeling-of-acceleration producing control need to be made up for with the output of battery 70, and battery discharge power Pout increases. However, battery discharge power Pout is restricted so as not to exceed allowable discharge power Wout, and thus, when the power that should be made up for with the output of battery 70 exceeds allowable discharge power Wout, the output of battery 70 becomes insufficient and the shortfall of the driving force occurs.

In order to eliminate such shortfall of the driving force, ECU 200 calculates initial value NEini of the engine rotation speed during the feeling-of-acceleration producing control as described below.

Figure 7:
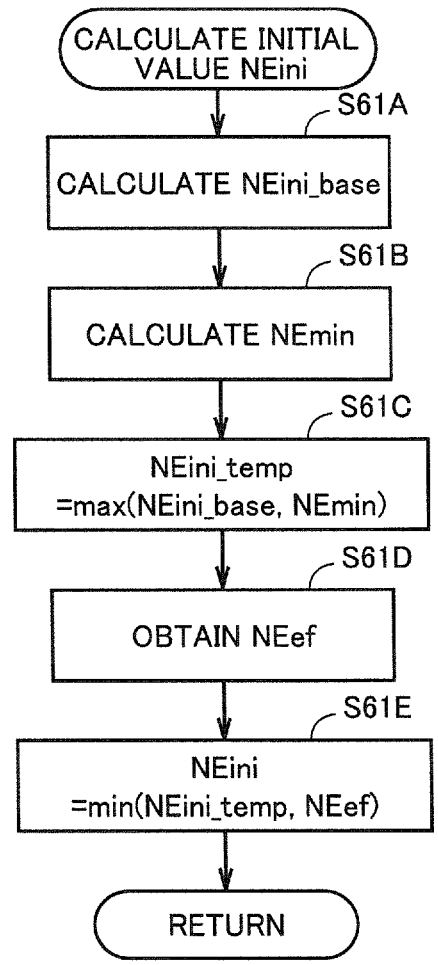
FIG. 7 is a flowchart showing a detailed flow of processing for calculating an initial value NEini of the engine rotation speed (processing in S61 in FIG. 3).

FIG. 7 is a flowchart showing a detailed flow of processing for calculating initial value NEini of the engine rotation speed (processing in S61 in FIG. 3).

In S61A, ECU 200 calculates basic initial value NEini_base of the engine rotation speed. For example, ECU 200 calculates basic initial value NEini_base by using the following equation (d):

$$NEini\_base = NEef - \text{prescribed value } N0 \qquad (d).$$

Namely, ECU 200 sets, as basic initial value NEini_base, a value lower than optimum rotation speed NEef by prescribed value N0. At this time, prescribed value N0 can be a variable value that changes in accordance with accelerator opening degree A and vehicle speed V.

In S61B, ECU 200 sets a lower limit value NEmin of the engine rotation speed. This lower limit value NEmin is a lower limit value of engine rotation speed NE at which battery discharge power Pout can be maintained to be equal to or lower than a prescribed electric power Pout1 and requested vehicle power Preq can be achieved.

For example, ECU 200 calculates, as a requested lower limit engine power PEmin1 at the time of 1 atmospheric pressure, a value obtained by subtracting prescribed electric power Pout1 from requested vehicle power Preq, as shown in the following equation (e1):

$$PEmin1 = Preq - \text{prescribed electric power } Pout1 \qquad (e1).$$

Prescribed electric power Pout1 herein is preliminarily set to have a value lower than allowable discharge power Wout by the prescribed electric power.

Then, ECU 200 calculates, as a requested lower limit engine power PEmin, a value obtained by correcting requested lower limit engine power PEmin1 at the time of 1 atmospheric pressure based on atmospheric pressure PA. For example, ECU 200 calculates requested lower limit engine power PEmin by using the following equation (e2):

$$PEmin = PEmin1 \times \text{correction coefficient } Kpa \qquad (e2).$$

Correction coefficient Kpa herein is the same as correction coefficient Kpa used in the equation (a). Namely, for example, correction coefficient Kpa is set at "1/atmospheric pressure PA" or "(intake air temperature THA/273)/atmospheric pressure PA".

Then, ECU 200 calculates lower limit value NEmin of the engine rotation speed by using requested lower limit engine power PEmin and the fuel efficiency line. Engine rotation speed NE is maintained to be equal to or higher than lower limit value NEmin thus calculated, and thereby, battery discharge power Pout can be maintained to be equal to or lower than prescribed electric power Pout1 and requested vehicle power Preq can be achieved.

In S61C, ECU 200 selects a larger one of basic initial value NEini_base and lower limit value NEmin as a temporary initial value NEini_temp of the engine rotation speed.

Figure 8:
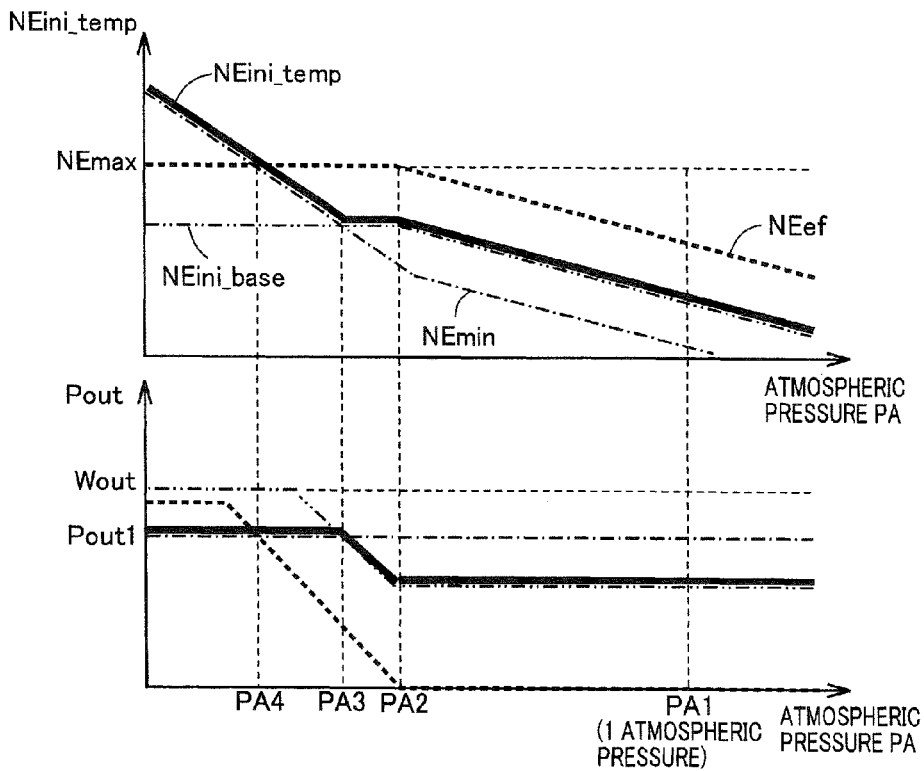
FIG. 8 is a diagram showing one example of a correspondence relation among a temporary initial value NEini_temp, a battery discharge power Pout and an atmospheric pressure PA.

FIG. 8 is a diagram showing one example of a correspondence relation among temporary initial value NEini_temp, battery discharge power Pout and atmospheric pressure PA. In FIG. 8, optimum rotation speed NEef and battery discharge power Pout corresponding to optimum rotation speed NEef are indicated by broken lines, lower limit value NEmin and battery discharge power Pout corresponding to lower limit value NEmin are indicated by alternate long and short dash lines, basic initial value NEini_base and battery discharge power Pout corresponding to basic initial value NEini_base are indicated by alternate long and two short dashes lines, and temporary initial value NEini_temp and battery discharge power Pout corresponding to temporary initial value NEini_temp are indicated by solid lines.

When atmospheric pressure PA is higher than a prescribed atmospheric pressure PA3 and lower limit value NEmin is lower than basic initial value NEini_base, basic initial value NEini_base is selected as temporary initial value NEini_temp. As a result, the feeling-of-acceleration producing control can be started from basic initial value NEini_base and battery discharge power Pout can be maintained to be lower than prescribed electric power Pout1.

On the other hand, when atmospheric pressure PA becomes lower than prescribed atmospheric pressure PA3, and in accordance therewith, lower limit value NEmin exceeds basic initial value NEini_base, lower limit value NEmin is selected as temporary initial value NEini_temp. As a result, even when atmospheric pressure PA becomes lower than prescribed atmospheric pressure PA3, the feeling-of-acceleration producing control can be started from lower limit value NEmin and battery discharge power Pout can be maintained at prescribed electric power Pout1. Therefore, even when the feeling-of-acceleration producing control is started in the state where atmospheric pressure PA is lower than prescribed atmospheric pressure PA3, the shortfall of the driving force caused by the shortfall of output of battery 70 can be suppressed.

Referring again to FIG. 7, in S61D, ECU 200 obtains optimum rotation speed NEef set in S31 in FIG. 3 (reads optimum rotation speed NEef from the memory).

In S61E, ECU 200 sets a smaller one of temporary initial value NEini_temp selected in S61C and optimum rotation speed NEef as initial value NEini. Namely, ECU 200 restricts initial value NEini to be equal to or lower than optimum rotation speed NEef (i.e., equal to or lower than upper limit rotation speed NEmax).

Figure 9:
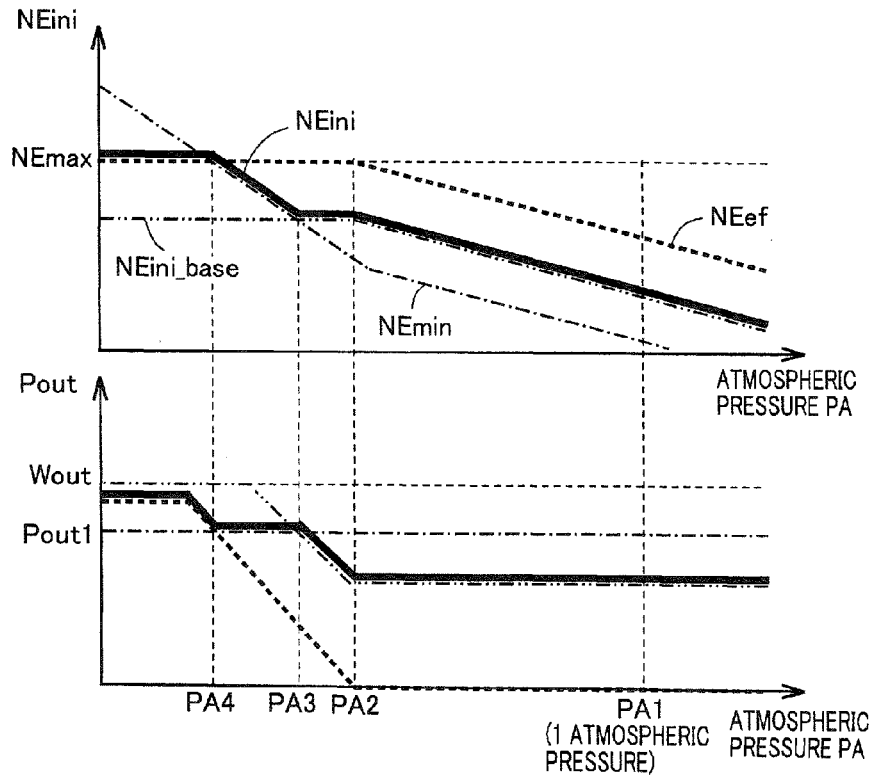
FIG. 9 is a diagram showing one example of a correspondence relation among initial value NEini, battery discharge power Pout and atmospheric pressure PA.

FIG. 9 is a diagram showing one example of a correspondence relation among initial value NEini, battery discharge power Pout and atmospheric pressure PA. In FIG. 9, initial value NEini and battery discharge power Pout corresponding to initial value NEini are indicated by solid lines. The other broken lines, alternate long and short dash lines, and alternate long and two short dashes lines are the same as those shown in FIG. 8 above, and thus, detailed description will not be repeated here.

In a region where atmospheric pressure PA is lower than a prescribed atmospheric pressure PA4, temporary initial value NEini_temp shown in FIG. 8 exceeds optimum rotation speed NEef (upper limit rotation speed NEmax).

In contrast, in the region where atmospheric pressure PA is lower than prescribed atmospheric pressure PA4, initial value NEini shown in FIG. 9 is restricted to optimum rotation speed NEef (upper limit rotation speed NEmax). Therefore, it is possible to prevent engine rotation speed NE from exceeding optimum rotation speed NEef (upper limit rotation speed NEmax) and the user from having an uncomfortable feeling.

Since initial value NEini is restricted to optimum rotation speed NEef (upper limit rotation speed NEmax), battery discharge power Pout becomes higher than prescribed electric power Pout1, while battery discharge power Pout is maintained to be lower than allowable discharge power Wout, as shown in FIG. 8. As a result, the shortfall of the driving force caused by the shortfall of output of battery 70 does not occur.

As described above, when acceleration is requested by the user, ECU 200 according to the present embodiment executes the feeling-of-acceleration producing control (NE increase control) for increasing engine rotation speed NE from initial value NEini lower than optimum rotation speed NEef, with an increase in vehicle speed. With battery discharge power Pout, ECU 200 makes up for the shortfall of PE caused by the feeling-of-acceleration producing control.

Furthermore, when starting the feeling-of-acceleration producing control, ECU 200 calculates basic initial value NEini_base lower than optimum rotation speed NEef by prescribed value N0, and calculates, based on atmospheric pressure PA, lower limit value NEmin that allows battery discharge power Pout to be maintained to be equal to or lower than prescribed electric power Pout1. Then, ECU 200 selects a larger one of basic initial value NEini_base and lower limit value NEmin as initial value NEini of the engine rotation speed at the start of the feeling-of-acceleration producing control. As a result, even when atmospheric pressure PA is low, battery discharge power Pout can be maintained to be equal to or lower than prescribed electric power Pout1. Therefore, even when the feeling-of-acceleration producing control (NE increase control) is started in the low atmospheric pressure PA state, the shortfall of the driving force caused by the shortfall of output of battery 70 can be suppressed.

<Modification>

The aforementioned embodiment can also be changed as follows, for example.

(1) In the aforementioned embodiment, when the feeling-of-acceleration producing control is started in the region where atmospheric pressure PA is low, initial value NEini of the engine rotation speed is determined to prevent occurrence of the shortfall of the driving force. However, in the case as well where atmospheric pressure PA decreases after the start of the feeling-of-acceleration producing control, the engine rotation speed may be determined by using the similar method.

(2) In the aforementioned embodiment, during the feeling-of-acceleration producing control, a rate of increase obtained by adding accelerator-corresponding increase rate dNEa to a larger one of vehicle speed-corresponding increase rate dNEv and time-corresponding increase rate dNEt is calculated as increase rate dNE (see the aforementioned equation (b) and the like). However, a method for calculating increase rate dNE is not limited thereto.

For example, accelerator-corresponding increase rate dNEa may be deleted from the aforementioned equation (b). In addition, vehicle speed-corresponding increase rate dNEv may be set as increase rate dNE, or time-corresponding increase rate dNEt may be set as increase rate dNE.

(3) In the aforementioned embodiment, description has been given to the case in which the vehicle driving force is controlled based on the power requested for the vehicle. However, the vehicle driving force may be controlled based on the torque requested for the vehicle.

It should be understood that the embodiment disclosed herein is illustrative and not limitative in any respect. The scope of the present invention is defined by the terms of the claims, rather than the description above, and is intended to include any modifications within the scope and meaning equivalent to the terms of the claims.

REFERENCE SIGNS LIST

1 vehicle; 2 monitoring sensor; 3 vehicle speed sensor; 4 atmospheric pressure sensor; 5 intake air temperature sensor; 10 engine; 16 drive shaft; 20 first motor; 30 second motor; 40 power split device; 58 speed reducer; 70 battery; 80 driving wheel; 200 ECU.

The invention claimed is:

1. A hybrid vehicle that can run by using motive power from at least one of an engine whose output changes in accordance with an atmospheric pressure and a motor driven by output electric power of a power storage device, the hybrid vehicle comprising:
  a continuously variable transmission provided between the engine and a driving wheel; and
  a control device configured to:
  (i) control the engine, the motor and the continuously variable transmission;
  (ii) calculate a requested output of the engine based on a requested output of the hybrid vehicle and the atmospheric pressure;
  (iii) calculate a requested rotation speed of the engine based on the calculated requested output;
  (iv) select a smaller one of the calculated requested rotation speed and a predetermined upper limit rotation speed as an optimum rotation speed of the engine;
  (v) when acceleration is requested, execute an increase control for increasing a rotation speed of the engine from a value lower than the optimum rotation speed, as vehicle speed increases;
  (vi) by driving the motor with the output electric power of the power storage device, makes up for a shortfall of output of the engine caused by the increase control;
  (vii) when executing the increase control, calculate a basic rotation speed lower than the optimum rotation speed by a prescribed speed;
  (viii) calculate a lower limit rotation speed of the engine based on the atmospheric pressure, the lower limit rotation speed of the engine allowing the output electric power of the power storage device to be maintained to be equal to or smaller than a prescribed value; and
  (ix) execute a selection processing for selecting a larger one of the basic rotation speed and the lower limit rotation speed as the rotation speed of the engine during the increase control.

2. The hybrid vehicle according to claim 1, wherein the control device is configured to execute the selection processing when starting the increase control, and thereby, the control device is configured to set an initial rotation speed of the engine during the increase control.

3. The hybrid vehicle according to claim 2, wherein the control device is configured to execute processing for restricting the initial rotation speed to be equal to or lower than the optimum rotation speed.

* * * * *